United States Patent [19]

Ellis et al.

[11] Patent Number: 4,925,361

[45] Date of Patent: May 15, 1990

[54] METHOD FOR HANDLING SHEET MATERIAL

[75] Inventors: Benny J. Ellis, Gilbert; Kurt H. Daniels, Higley, both of Ariz.

[73] Assignee: Western Insulated Glass Company, Phoenix, Ariz.

[21] Appl. No.: 285,789

[22] Filed: Dec. 15, 1988

[51] Int. Cl.$^5$ .............................................. B65H 3/08
[52] U.S. Cl. ................... 414/786; 414/798.9; 414/796.4; 414/783; 414/737; 271/107; 271/90
[58] Field of Search ............... 414/798.9, 796.4, 797, 414/788.5, 783, 737, 768, 769, 770, 780, 786; 271/90, 103, 107; 198/411, 412

[56] References Cited

U.S. PATENT DOCUMENTS

| | | | |
|---|---|---|---|
| 3,094,322 | 6/1963 | Kocher et al. | 414/798.9 X |
| 3,126,108 | 3/1964 | Langhart | 214/8.5 |
| 3,168,184 | 2/1965 | Galvin | 198/20 |
| 3,178,041 | 4/1965 | Wheat | 214/7 |
| 3,595,556 | 7/1971 | Schonauer | 269/21 |
| 3,598,263 | 8/1971 | Ehmke | 214/652 |
| 3,679,076 | 7/1972 | Miller | 214/152 |
| 3,690,477 | 9/1972 | Nilsson | 414/798.9 |
| 3,765,550 | 10/1973 | Tausheck | 214/77 |
| 3,811,578 | 5/1974 | Jureit et al. | 214/7 |
| 3,834,557 | 9/1974 | Devillers | 214/1 BH |
| 3,884,278 | 5/1975 | Nakashima | 414/798.9 X |
| 3,934,871 | 1/1976 | Dean | 271/184 |
| 4,093,083 | 6/1978 | Klaus | 214/7 |
| 4,444,537 | 4/1984 | Werner | 414/107 |
| 4,676,713 | 6/1987 | Voelpel | 414/590 |
| 4,697,973 | 10/1987 | Hahn et al. | 414/798.9 |
| 4,750,854 | 6/1988 | Pascale et al. | 414/107 |

FOREIGN PATENT DOCUMENTS

| | | | |
|---|---|---|---|
| 2242934 | 3/1972 | Fed. Rep. of Germany | 414/798.9 |
| 3544332 | 6/1987 | Fed. Rep. of Germany | 271/90 |
| 1464846 | 1/1967 | France | 414/780 |
| 0087123 | 5/1985 | Japan | 414/798.9 |
| 0055034 | 3/1986 | Japan | 271/90 |

Primary Examiner—Robert J. Spar
Assistant Examiner—James T. Eller, Jr.
Attorney, Agent, or Firm—LaValle D. Ptak

[57] ABSTRACT

Large sheets of float glass or other large sheets of material are transferred from a vertical storage position to a horizontal surface automatically. A carriage is mounted on a support frame near the stack of sheets of material, which rest against an inclined surface such that the bottom of each sheet is located forward of the top thereof to cause the plane of the stack of sheets to tilt a few degrees past vertical. A sheet engaging member is located on the carriage for pulling the top sheet of the stack forward, pivoting the sheet on its bottom, to a point where the top of the sheet is moved past vertical on the opposite side from the stack of sheets to an unstable position. In this position, the sheet is released to free fall to a horizontal position on a support surface located in a horizontal plane adjacent the bottom of the sheets in the storage position.

2 Claims, 3 Drawing Sheets

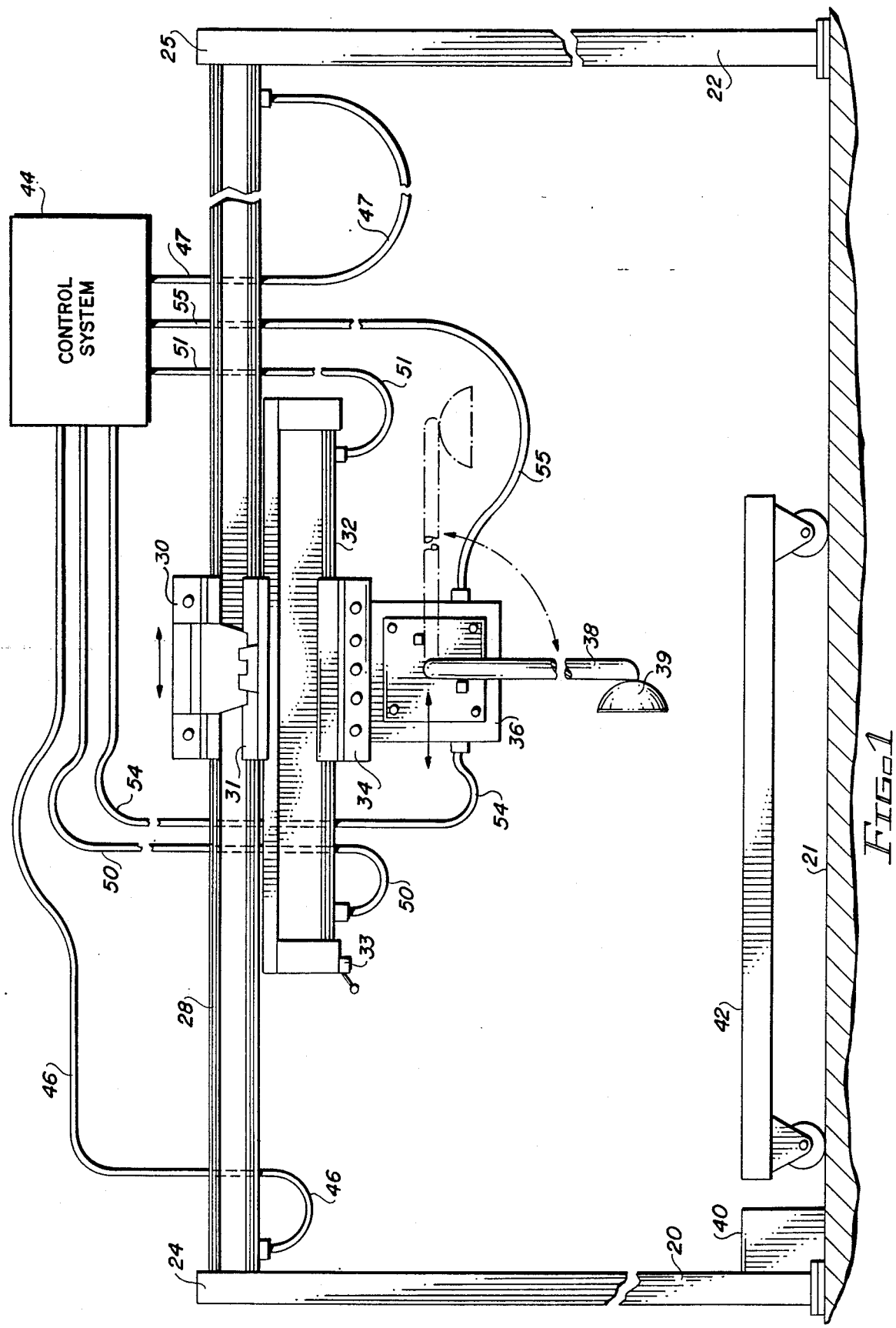

METHOD FOR HANDLING SHEET MATERIAL

BACKGROUND

The handling of large sheets of heavy material, such as float glass or the like, is effected in a variety of different ways. In many applications, the stacking or moving such sheets of material is accomplished manually by two or more production workers. Manual handling of material, such as sheets of float glass, however, is difficult repetitive work; and substantial care must be exercised to prevent the breakage of glass during handling and stacking of float glass sheets.

In window manufacturing plants, large sheets of float glass, typically on the order of eleven feet by fourteen feet (11'×14') are stored on edge on support apparatus or bucks which cause the individual sheets to be inclined in a plane 5° to 15° from vertical. A large number of sheets are stored on such support apparatus or bucks, leaning against the support apparatus. The top or front sheet of the stack typically is removed from the stack and is placed on a horizontal work table or platform. Sometimes this is done manually by pivoting the sheets about the bottom edge and allowing them to free-fall onto a horizontal surface. The glass sheet then is cut into the desired smaller sizes for use in window fabrication and the like. Because the sheets are relatively heavy, on the order of four-hundred fifty pounds (450 lbs.) or more, manual movement of the sheets in this manner is difficult, and periodically a sheet is dropped and broken.

In some plants, the sheet removing operations for moving the sheets of glass from the near vertical stored position to a horizontal position is carried out by workers who manipulate a frame equipped with vacuum cups which attach to the glass. The glass sheets must be carefully lowered into position and the frame adds to the weight being manipulated by the workers.

Automatic equipment for handling large sheets of float glass in glass manufacturing plants has been developed. Three patents which disclose vacuum operated glass handling devices primarily used in a manufacturing plant to lift horizontal sheets of glass from a conveyor belt to stack them in a vertical stack, are the U.S. Pat. Nos. to Wheat #3,178,041; Miller #3,679,076; and Klaus #4,093,083. All three of these patents disclose devices which hold the glass in place by means of suction apparatus throughout the entire movement of the glass sheet from the horizontal position to the vertical or near vertical storage position. In view of the heavy weight of large glass sheets, strong vacuum systems and massive mechanical and hydraulic machinery is necessary.

Three other patents which disclose systems for moving sheets of glass from a vertical stack and placing them on a horizontal surface, are the U.S. Pat. Nos. to Langhart #3,126,108; Werner #4,444,537; and Pascale #4,750,854. These patents are similar to the three patents mentioned above, except that the vacuum systems are used to move the glass first from a vertical position to place it in a horizontal position. The entire movement, however, is handled by a mechanical device which holds the glass in place by means of a suction apparatus throughout the movement from one position to another As in the case of the three patents mentioned above, the devices of these patents would require extremely heavy duty mechanical structures and very strong vacuum systems if they were to be used for handling large sheets of float glass (for example 11'×14'×⅛" or ¼" thick).

Other prior art exists for utilizing automatic or semiautomatic equipment employing vacuum suction cups for moving sheets of glass into place in a factory or on a construction site. Such devices, however, employ the vacuum apparatus to hold the glass in place throughout the entire movement and placement of the glass, so that the vacuum apparatus must be capable of holding the weight of whatever size glass sheet is handled by it.

It is desirable to provide a method and apparatus for handling sheet material, particularly large sheets of float glass, to move such sheets of material from a vertical position to a horizontal position in a simple and effective manner without requiring heavy duty equipment to accomplish such a purpose.

SUMMARY OF THE INVENTION

It is an object of this invention to provide an improved material handling apparatus.

It is another object of this invention to provide an improved apparatus for moving large sheets or floats of glass from a vertical position to a horizontal position.

It is an additional object of this invention to provide an improved free-fall robot for moving sheets of glass or other material from a near vertical storage position to a horizontal position.

It is yet another object of this invention to provide a simple pneumatic robot apparatus for moving sheets of float glass or the like from a near vertical storage position to a horizontal table located adjacent the storage position thereof.

In accordance with a preferred embodiment of this invention, material handling apparatus for transferring sheets of material from a substantially vertical storage position to a horizontal surface located adjacent the storage position includes a storage support member for supporting a stack of sheets of material against an inclined surface. The bottom of each sheet is located forward of the top to cause the planes of the sheets of material to tilt a few degrees past vertical. A support frame is located adjacent the storage support member and has an engaging device mounted on it contacting the front or facing sheet of the stack. The engaging device is operated to releasably secure it to the top or facing sheet of the stack. Once the top sheet of the stack is thus engaged, the engaging device is moved away from the stack a short distance to tilt the sheet a few degrees past vertical on the opposite side from the storage position. At this time the sheet is released and is allowed to free-fall to a horizontal position, pivoting about the bottom thereof as it falls.

BRIEF DESCRIPTION OF THE DRAWINGS

FIG. 1 is a diagrammatic side view of a preferred embodiment of the invention;

DETAILED DESCRIPTION

Figure 2A:
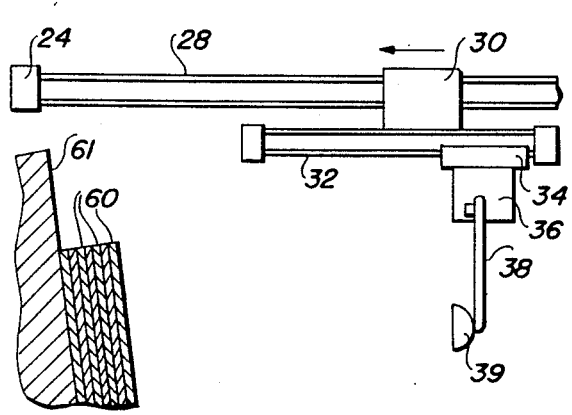
FIGS. 2A through 2G illustrate various operating stages of the embodiment of FIG. 1.

Reference now should be made to the drawings, in which the same reference numbers are used throughout the different figures to designate the same components.

FIG. 1 is a diagrammatic representation of a preferred embodiment of the invention. The components shown in FIG. 1 are purposely drawn out of proportion to emphasize the structural features and interrelationship of the parts of a primary feature of the invention.

The device shown in FIG. 1 is utilized for moving large sheets of float glass, one at a time, from vertically oriented stacks of such sheets. The sheets of glass are stacked on edge on a storage rack resting against an inclined surface or support, so that the planes of the sheets extend backward at a slight angle (5° to 15°) from vertical. The sheets typically are 11' wide × 14' long and are made of $\frac{1}{4}$" or $\frac{1}{4}$" thick glass. Sheets of this size weigh approximately four-hundred fifty pounds (450 lbs.) to six-hundred fifty pounds (650 lbs.), so that manual handling of such large heavy sheets is difficult.

The apparatus shown in FIG. 1 is employed for the purpose of moving such sheets from a vertical orientation in the stack to a horizontal table or cart for further processing in a window manufacturing factory or the like. To accomplish this, the mechanism shown in FIG. 1 is mounted on a frame on the top of the storage rack or on a separate frame. Such a frame may consist of four upright vertical support posts at each corner. The frame is wider than the length of the glass sheets and extends to a height above the sheets. Two of the corner posts 20 and 22 of such a frame are shown in FIG. 1. Two similar posts are located directly behind the posts 20 and 22 for the other two corners of the support frame. Since this is a simple rectangular configuration, the details of the frame are not considered necessary here.

At the top of the separate frame shown in FIG. 1, a pair of upper frame members 24 and 25 extend across the two posts at each end. Similar supporting members also may be interconnected between the various posts to give the frame structural rigidity. The frame is open, however, on the left-hand side, as shown in FIG. 1, to permit stacking and removal of the large float glass sheets from a support surface 40. The vertical upright members 20, 22, (and the other two which are not shown) may be secured to the floor 21 to hold the frame in a fixed position relative to the platform 40 on which the glass sheets are stacked. Obviously, of the apparatus of FIG. 1 is attached to a frame mounted on the top of the storage rack, the posts 20,22 and upper frame members 24 and 25 are not needed.

At the top of FIG. 1 the glass handling apparatus of the invention is shown in large proportion compared to the rest of the components of FIG. 1. This is done to emphasize the general structural features and overall configuration of the apparatus. This comprises a first pneumatic cylinder 28 (approximately four feet long) mounted on the support frame. In FIG. 1, this is shown with the cylinder 28 mounted between the cross members 24 and 25 substantially near the center for moving a first carriage 30 horizontally back and forth in the direction of the arrows indiciated. The carriage 30 has a depending portion 31 which is attached to the top of a second pneumatic cylinder 32 (approximately two feet long), so that the cylinder 32 is carried back and forth by the carriage 30 under control of the cylinder 28.

At the left-hand end of the cylinder 32 is a limit switch 33 used to sense the presence of the upper portion of a glass sheet 60 on an inclined support member 61 (FIGS. 2A through 2G) to locate the mechanism in a working position to remove sheets of glass 60 from a stack resting against the surface 61.

The cylinder 32 is used to operate a carriage 34 back and forth along its length, in the direction of the arrows, under the control of a control system 44 as the machine is operated. The carriage 34, in turn, has a mechanism 36 attached to it for operating a pivotal or rotary arm 38 from a downwardly-extending vertical position to an upper horizontal position (shown in dotted lines in FIG. 1) under the control of signals applied to it.

The lower end of the arm 38 has a vacuum suction cup 39 and vacuum pump (not shown in FIG. 1) attached to it. The cup 39 has a resilient outer edge on it made of relatively air impervious materials; so that when the face of the cup 39 engages a glass sheet and a vacuum is applied to the cup 39 by the vacuum pump, the cup is secured to the face of the glass sheet, as long as the vacuum is applied. Generally, the outer diameter of the cup 39 is of the order of three (3) to six (6) inches.

The machine shown in FIG. 1 is made so that the cylinders 28 and 32 are located above the top of the upper edges of any glass sheets which are stacked to the left of the machine. The operating member 36 also is designed to be located above or near the top of such sheets, so that only the arm 38 with the cup 39 extends below the top edge of the sheets, as is more clearly shown in FIGS. 2A through 2G. The mechanism is for the purpose of moving glass sheets from the vertical stack on the support 40 to a horizontal position on the surface of the table 42, illustrated in FIG. 1. The horizontal receiving surface for the glass sheets may be in the form of a wheeled table 42, a conveyor belt, or any other suitable surface used for subsequent work on the sheets.

A control system 44 is provided for either electrically, pneumatically or hydraulically controlling the operation of the cylinders 28 and 32, and the arm operating mechanism 36 in accordance with signals produced by the system 44. Such signals are applied over a pair of lines 46 and 47 to the cylinder 28 to drive the carriage 30 back and forth in accordance with the signals applied over these lines Similarly, signals are applied over a pair of lines 50 and 51, to opposite ends of the cylinder 32 to drive the carriage 34 back and forth along the length of the cylinder 32. Finally, a pair of lines 54 and 55 are coupled to the operating mechanism 36 for pivoting the arm 38 between its vertical and horizontal positions. In addition, a separate pressure line (not shown in FIG. 1) for operating the vacuum pump is provided through the mechanism 36 to the vacuum pump for the cup 39 on the arm 38 for controlling the operation of the vacuum cup in accordance with the operating sequence of the machine.

Reference now should be made to FIGS. 2A through 2G which illustrate the operating stages of the machine. Initially, the carriage 30 on the cylinder 28 and the carriage 34 on the cylinder 32 both are moved to their rightmost positions, as viewed in FIGS. 1 and 2, to permit sheets of glass 60 to be stacked on edge on the surface 40, resting against the inclined surface 61. Typically, this may be done by means of forklift tractors and the like, which store a large number of sheets against the surface 61, as illustrated in FIG. 2A.

Figure 2E:
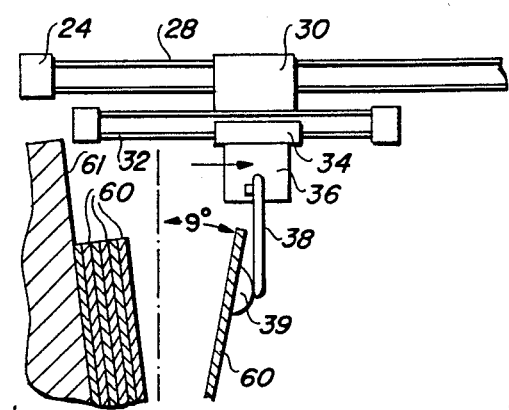
Figure 2B:
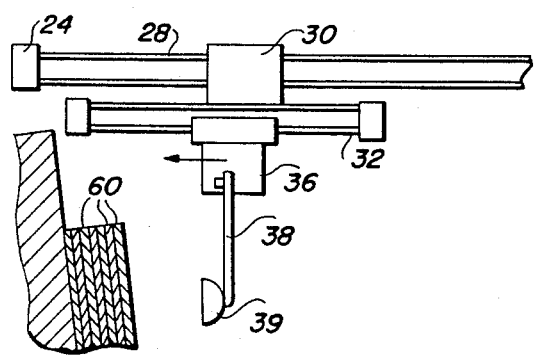
Figure 2F:
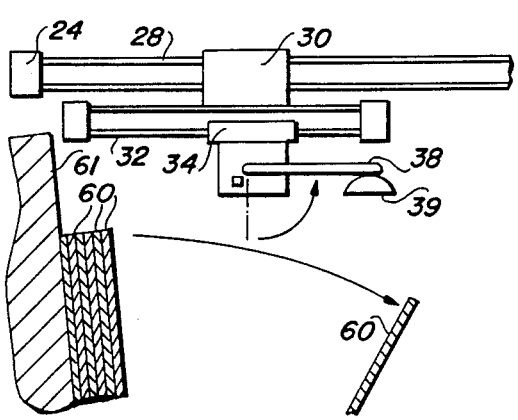
Figure 2C:
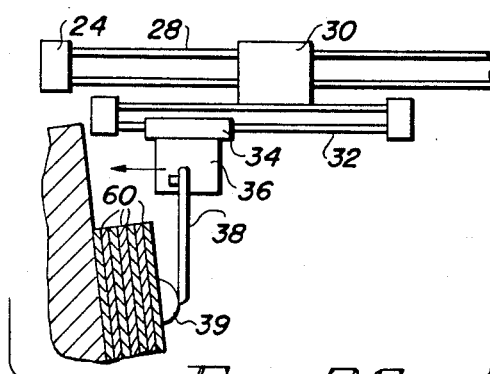

Once the sheets of glass 60 have been stacked, signals are applied to the cylinder 28 to move the carriage 30 toward the left as shown in FIG. 2A. This movement takes place until the sensing switch 33 (FIG. 1) engages the front or top sheet of glass 60. At this time, movement of the carriage 30 stops; and the carriage 34 on the cylinder 32 is moved toward the left as indicated in FIG. 2B. This movement occurs until the vacuum cup 39 engages the front surface of the top or right-hand sheet 60 of the stack of glass sheets, as illustrated in FIG. 2C. At this time, a vacuum is applied to the vacuum cup 39 to secure the cup 39 to the face of the glass sheet 60. Typically, the arm 38 extends downwardly from the carrier 36 to a point where the vacuum cup 39 engages the top sheet 60 between three and twelve inches (3" and 12") from the top edge (this can be varied for sheets of different dimensions, but is a typical location for 11'×14' sheets, as described above).

Figure 2G:
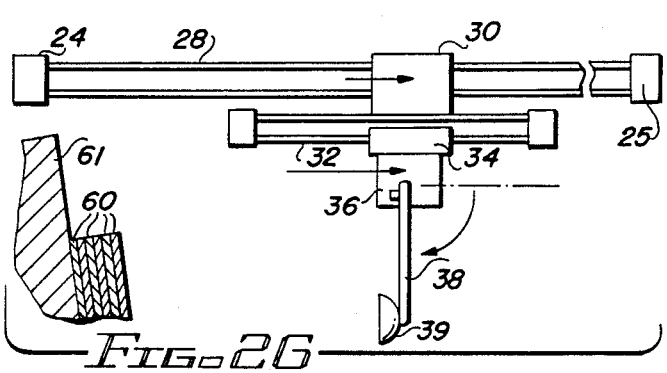
Figure 2D:
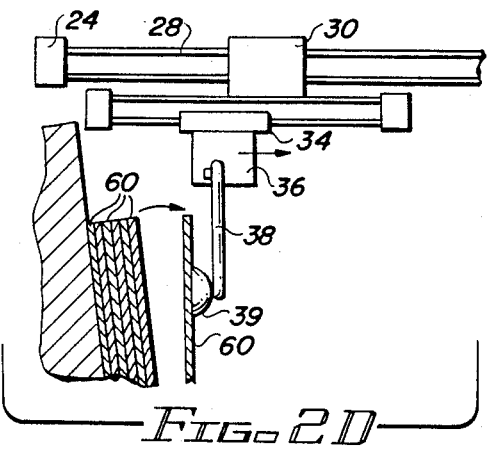
Figure 3:
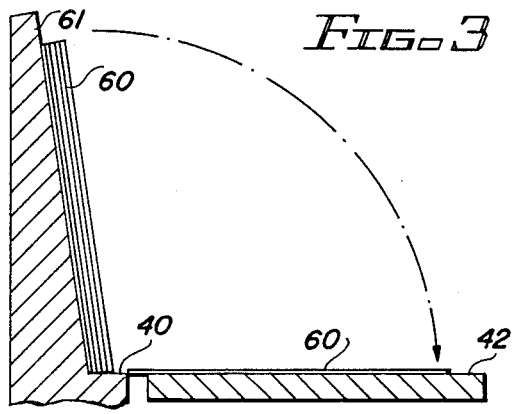
FIG. 3 illustrates the manner in which the device of FIGS. 1 and 2 operates.

Once the vacuum cup 39 is secured to the sheet 60 near its upper edge, the carriage 34 is moved to the right on the cylinder 32, as shown in FIG. 2D, to tip the sheet 60 forward, rocking it on its lower edge, as illustrated in FIG. 2D. When the sheet 60, which is being pulled to the right by the carriage 34, is tipped slightly past vertical (0° to 5°) toward the right (illustrated in FIG. 2E), a limit switch operates to cause the vacuum in the cup 39 to be released; and the arm 38 is snapped rapidly and sharply toward the horizontal position shown in FIG. 2F. The glass sheet 60 then free-falls, pivoting about its lower edge until it reaches the horizontal position shown diagrammatically in FIG. 3. In this position, the sheet 60 lies flat on the horizontal receiving surface 42 of the work table, cart or the like. Because there is no interference with the free-falling of the glass and since it remains properly oriented by virtue of pivoting on the lower edge, no breaking or shearing stress is applied to the sheet, since all of the forces applied to it when it engages the surface 42 are applied evenly throughout the face of the sheet 60.

Once the operation shown in FIG. 2F has been completed, the arm 38 is moved back to the position shown in FIG. 2B; and the sequence described above for FIGS. 2B through 2F is repeated. This is the normal operating sequence for the apparatus to remove the sheets 60 one at a time from the stack, as desired, to place them on the horizontal work surface 42. After all of the sheets 60 have been removed, the carriages 30 and 34 both are moved to the right, as illustrated in FIG. 2G to place them on the right-hand side of the supporting framework shown in FIG. 1; so that additional sheets 60 may be stacked on the surface 40 resting against the support 61 as described above. Once this has been accomplished, the sequence described above for FIGS. 2A through 2F is repeated.

It is important to note that the mechanism illustrated in FIGS. 1 and 2 does not carry any substantial weight of the glass sheets 60 at any time during the operation. The maximum amount of weight supported by the arm 38 and the vacuum cup 39 occurs at the extreme left position when the arm 38 commences to pull the sheets away from the stack, as illustrated in FIG. 2C. This is a very slight force, however, and it is not a lifting force. The force substantially is a lateral force, amounting to no more than a steadying of the sheet 60 as it is moved a few degrees from one side of vertical to the other side of vertical, as illustrated in FIGS. 2C through 2E. Consequently, the apparatus consisting of the cylinders 28, 32, 36, the arm 38, and the vacuum cup 39, do not need to be heavy duty components. Similarly, the vacuum which is applied to the cup 39 for the purpose of tipping the sheet 60 from the position shown in FIG. 2C to the position of FIG. 2E is significantly less than that required to lift heavy glass sheets 60 from one position to another. Because the free-fall nature of placement of the sheets 60 from a vertical configuration to the horizontal position on the surface 42 dies not twist or stress the sheets in any way.

Figure 4:
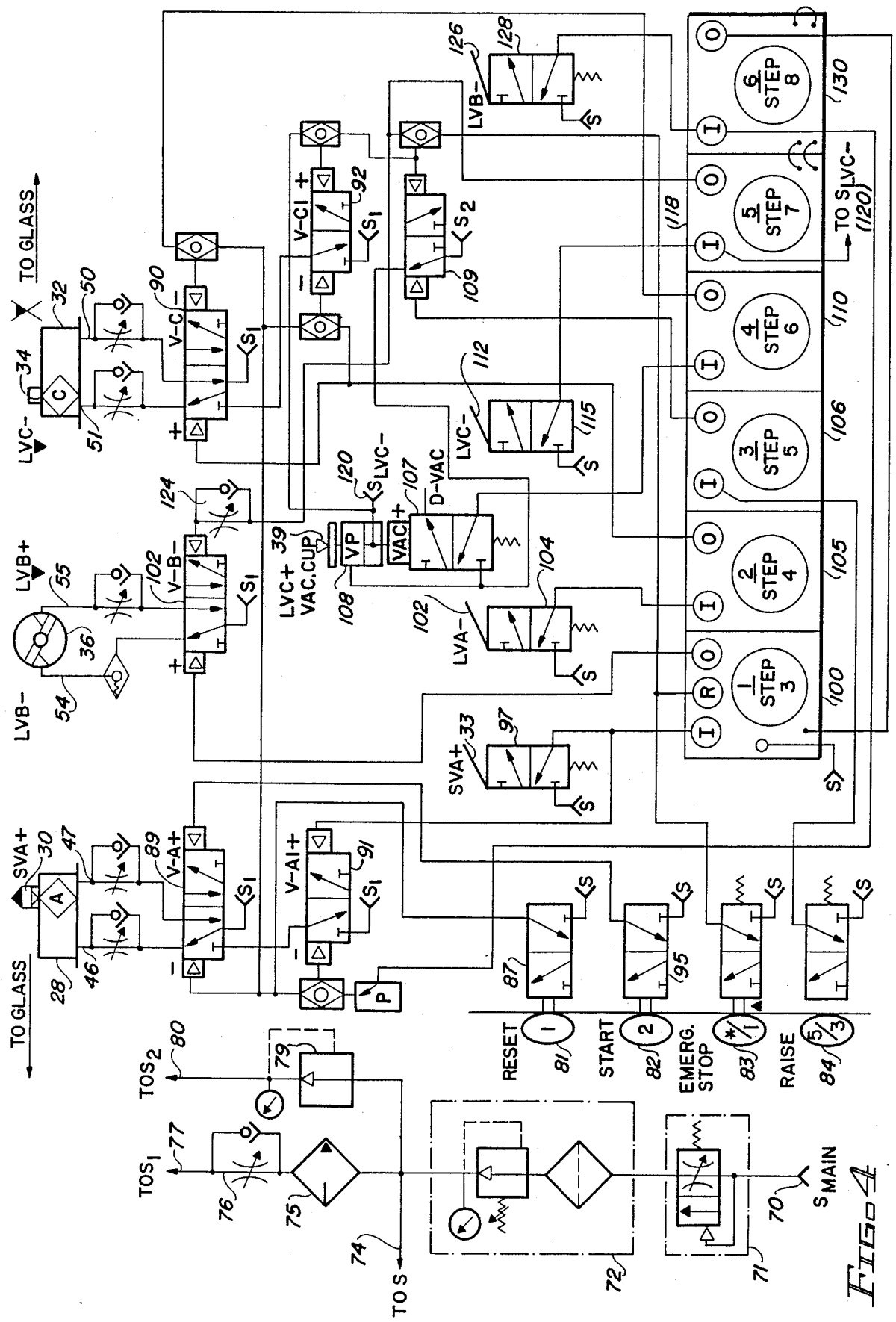
FIG. 4 is a schematic diagram of the pneumatic system used to operate the embodiment of FIGS. 1 and 2.

Reference now should be made to FIG. 4 which is directed to a pneumatic system for operating the mechanism shown in FIGS. 1 and 2A through 2G. As explained previously, the operating sequence may be effected by means of electrical control systems, hydraulic systems, or pneumatic systems. The operating sequence may be accomplished equally as well by any of these different technolgies. When a plant has a compressed air supply available to it, however, the pneumatic system of FIG. 4 is a relatively inexpensive and trouble free approach to operating the mechanism described.

FIG. 4 illustrates the various valves and system interconnections used to operate the device shown in FIGS. 1 and 2 and described above. The pneumatic control system of FIG. 4 is typical of a system which is particularly useful in a window producing plant, since pressurized air supplies already are available.

The air supply for operating this system is obtained from a main supply 70 and is provided through a smooth start valve 71 to allow the system to slowly build up pressure and prevent any of the various cylinders from banging at start up of the system. The output of the slow start valve 71 then is supplied through a filter regulator 72 to produce, at its output 74, the air supply "S" which is the main air supply to the pilot valve in the system. This supply is regulated to a pressure which varies between 50 and 110 pounds per squar inch (psi) and is a non-lubricated supply. This same output also is supplied through a lubricator 75 and pressure regulator 76 to provide an output at 77, which is the air supply "S1" to the cylinders 28 and 32 and actuators. This supply is regulated to between 90 and 110 psi. The output of the filter regulator 72 also is supplied through a pressure regulator 79 to an output 80 which is the air supply "S2" to the vacuum pump. This supply is regulated to a pressure between 50 and 100 psi and is a non-lubricated supply.

Thus, the supplies "S" and "S2" are non-lubricated, and the supply "S1" is lubricated. The interconnections of these various air supplies at the stated pressures are not drawn to the various valves and inputs on the rest of FIG. 4 to avoid cluttering of the drawing. It is to be noted, however, that the inputs to the various valves and other components in the remainder of the pneumatic schematic diagram of FIG. 4 all are labeled with the appropriate one of the three supplies "S", "S1", or "S2". It is to be understood that these particular inputs in an operating system are connected directly to the appropriate ones of the outputs 74, 77 or 80, all of which in turn are provided with pressurized air from the main air supply provided at 70.

At the top of FIG. 4, the cylinders 28 and 32, along with the operator 36 for the arm 38 are provided with the same reference numbers, used in FIGS. 1 and 2. In addition, the pneumatic input lines to these components also are provided with the same reference numbers used in FIG. 1. The remainder of FIG. 4 constitutes the control system 44 shown in FIG. 1.

The operation of the control system is described in conjunction with four manually operated pushbuttons or control levers 81 (reset), 82 (start), 83 (emergency stop), and 84 (raise). The functions which are effected by depression of any one of these four pushbuttons or operating levers, cause the function designated by the label which they bear to occur. Prior to the initiation of any operation of the apparatus, it is advisable first to operate the reset pushbutton 81 to insure that the entire system is reset to an appropriate operating condition, with the carriages of the various cylinders and the arm 38 located in preparation for a proper sheet handling cycle.

When the reset button 81 is depressed, it interconnects a three-way valve 87 with the air supply ("S") to supply that air under pressure to the negative or retract input of a pair of three-way valves 89 and 90. These valves, in turn, supply lubricated air under pressure from the supply "S1" to retract the carriages 30 and 34 of both of the cylinders 28 and 32 to the right hand position, shown in FIGS. 1 and 2, away from the glass. At this time, operation of the reset valve 87 does not have any effect on the rotational operator 36. When the carriages on the cylinders 28 and 32 reach their extreme right hand positions, a pair of three-way control valves 91 and 92, respectively, are operated to shut off the air supply to the valves 89 and 91, respectively, to stop the operation of the cylinders 28 and 32. The system remains in this reset or stand-by condition until further operation of a different one of the pushbutton levers 82, 83 or 84.

In a normal operating sequence, once the operator is assured that a horizontal surface 42 is in place with its upper edge in a plane which is the same as or only slightly above the plane of the surface 40, and that there are no other obstacles in the path of free-falling glass sheets 60, the start lever or start button 82 is depressed. Pressing of the start button 82 causes air to be supplied from a three-way valve 95 to supply pressurized air from the supply "S" to the right-hand or opposite input of the four-way valve 89. This moves the carriage 30 on the cylinder 28 to the left, as viewed in FIGS. 1 and 2, until the sensing switch 33 of a limit valve 97 engages the front or top sheet of glass 60 in the stack.

It should be noted that if there is no glass, the carriage 30 moves to its full left position (FIGS. 1 and 2) without operation of the limit valve 97, and no further operation then would take place. When the limit valve 97, however, is operated by means of the lever 33 finding a sheet of glass 60, the valve 97 supplies air from the supply "S" through an output to the input "I" of a chamber 100 and back through the output "O" thereof to supply air from the supply "S" to a four-way valve 102.

This activates the valve 102 to extend the arm 38 to its downward position (if it is not already at that position after the reset mode) When the arm 38 extends to its downward position, it triggers or operates a sensor 102 of a three-valve 104 to supply air from an input supply "S" to the input "I" of a second chamber 105 and back through the output "O" of the chamber 105 to the left-hand input of the four-way valve 90 to move the carriage 34 on the cylinder 32 toward the left (as viewed in FIGS. 1 and 2) to meet the glass.

It should be noted that the "chambers" 100 and 105 and others which are shown across the bottom of FIG. 4, also may include indicator lights, activated by the operation of the various valves supplying inputs to them, to provide an operator with a visual indication of the state of operation of the system at all times. These indicators could be eliminated if they are not considered desirable and the various "I" and "O" outputs from the different chambers could be interconnected directly in accordance with the output lines shown in FIG. 4. It is considered desirable, however, to have an indication of the status of operation of the machine. For that reason, these indicators are shown in FIG. 4.

When the suction cup 39 on the arm 38 contacts the glass, the carriage 34 stalls against the glass to stop any leftward movement of the carriage 34 by the cylinder 32.

The operation stops here without futher manual intervention to provide an additional level of safety to be sure that the area is clear prior to the pulling off of the top sheet glass from the stack of glass sheets 60. If everything is clear, the operator then depresses the "RAISE" pushbutton or lever 84 to supply air through the input of chamber 106 (step 3/5) from the supply "S" and through the output "O" to the actuation input of a three-way valve 106. At the time this occurs, air is supplied from the supply "S2" through a three-way valve 109 to the vacuum valve 107 and pump 108 to supply vacuum to the cup 39 indicated diagrammatically in the center of FIG. 4. This causes the vacuum cup 39 to be secured to the face of the top or rightmost sheet 60 of glass in the stack of glass.

The valve 107 also then supplies pressurized air to the input "I" of the chamber 110 to provide an indication of this step in the operation, and the chamber 110 then supplies pressurized air from the output "O" thereof to the four-way valve 90, on the negative side thereof, to cause the cylinder 32 to move the carrier 34 toward the right (as viewed in FIGS. 1 and 2) to commence pulling the glass sheet 60 toward the right, in accordance with the illustration of FIG. 2D. Since the distance between the front face of the first sheet of glass 60 and the desired amount of pull to reach the point shown in FIG. 2E is a constant distance, a sensing limit switch 112 carried on the carriage 30 of the cylinder 28 is engaged by the rightward movement of the carriage 34 to operate a three-way valve 115 to supply air from the supply "S" to the input "I" of the next chamber 118.

Air supply from the chamber 118 through the output "O" and to the input 120 of the vacuum pump 108 and vacuum valve 107 causes the vacuum to be turned off thereby releasing the vacuum cup 39 from the glass. A small amount of air also may be blown into the cup 39 to assist in separation of the cup from the glass. At the same time, the valve 92 is actuated to turn off the supply of air to the valve 90 thereby stopping the movement of the carrier 34 by the cylinder 32.

The output "O" from chamber 118 is supplied through a flow control valve 124 to the retract input of the valve 102 to cause the actuator 36 to be rotated counter-clockwise 90°. This pivots the arm 38 out of the way to the horizontal dotted line position shown in FIG. 1 and the position shown in solid lines in FIG. 2F. The glass sheet 60 then is allowed to fall, as described previously in conjunction with FIG. 2F.

When the arm 38 retracts to the horizontal position, it contacts a position sensor 126 to operate a three-way valve 128 to supply air from the supply "S" to the input "I" of a chamber 130, the output of which automatically resets the system back to operating step three (chamber 100). The sequence of events occuring through the chambers 100 and 105, following the operation of the start button 32, then are repeated with the next sheet of glass being engaged by the suction cup 39 in preparation for its withdrawal. The sheet, however, will not be withdrawn until the pushbutton 84 is depressed to turn on the vacuum and cause the sequence of events through the chambers 106, 110, 118 and 130 to be repeated.

At any time, the emergency stop pushbutton 83 may be activated to prevent a new sheet of glass from being withdrawn and dropped or allowed to free-fall. When the button 83 is depressed, air from the supply "S" is applied to the reset input of the chamber 100. This has no effect on the positions of the cylinders 28 and 32, but the output supplied from chamber 100 to the four-way valve 102 (on the left-hand side as illustrated) overrides any other controls applied to the valve 102 and causes the arm 38 to remain in its downward position. It cannot retract from this position, so any glass which may be contacted by the suction cup 39 at this time cannot be released, irrespective of what position it is in. In addition, the valve 109 is operated to turn off the vacuum operated by means of the air supply "S2" through the valve 106; the sequence operation of the program is reset to step three (chamber 106); and the system stops operation. It cannot be restarted until the pushbutton 81 is manually actuated Actually, following any time the emergency stop button is actuated, the reset button 81 first should be operated, followed by operation of the start button 82 to cause the system operation to recycle in accordance with the sequence mentioned above.

It is to be noted that the pneumatic system which is shown in FIG. 4 is only one of several implementations of the operating sequence which may be effected to perform the functions described in conjunction with FIGS. 1 and 2. As mentioned previously, an electromechanical and electronic system may be used to control the operating sequence and to move the carriers 30, 34 and rotate the arm 38 mechanically. Also, a liquid hydraulic system may be employed if desired. Other changes and modifications will occur to those skilled in the art without departing from the true scope of the invention, as set forth in the appended claims.

We claim:

1. A method for transferring rigid, rectangular, flat sheets of glass from a substantially vertical storage position to a horizontal position includes the steps of:

storing a stack of sheets glass against an inclined surface such that the bottom of each sheet is located forward of the top thereof to cause the plane of the sheets to tilt a few degrees past vertical on one side of a vertical plane through the bottom of the top sheet of the stack;

engaging the top sheet of the stack near its top by means of a vacuum cup on a pivoted arm, the pivot point of which is located above the top of the sheets;

moving the top of such top sheet forward by moving the vacuum cup and arm away from the stack of sheets to pivot such top sheet about the bottom thereof a predetermined number of degrees past vertical on the other side of said vertical plane;

releasing the sheet to permit it to free fall to a horizontal position, pivoting about the bottom thereof; and catching the sheet on a horizontal surface located in a plane substantially the same as the plane of the bottoms of the sheets in the stack in the storage position.

2. A method for transferring rigid, rectangular, flat sheets of glass from a substantially vertical storage position to a horizontal position includes the steps of:

storing a stack of sheets of glass against an inclined surface such that the bottom of each sheet is located forward of the top thereof to cause the plane of the sheets to tilt a few degrees past vertical on one side of a vertical plane through the bottom of the top sheet of the stack;

engaging the top sheet of the stack near its top by means of a vacuum member;

moving the vacuum member away from the stack of sheets to pull the top of such top sheet forward a predetermined distance to pivot such top sheet about the bottom thereof a predetermined number of degrees past vertical on the other side of said vertical plane;

releasing the sheet to permit it to free fall to a horizontal position, pivoting about the bottom thereof; and catching the sheet on a horizontal surface located in a plane substantially the same as the plane of the bottoms of the sheets in the stack in the storage position.

* * * * *